United States Patent
Munoz, Jr. et al.

(10) Patent No.: US 6,896,058 B2
(45) Date of Patent: May 24, 2005

(54) METHODS OF INTRODUCING TREATING FLUIDS INTO SUBTERRANEAN PRODUCING ZONES

(75) Inventors: Trinidad Munoz, Jr., Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 22 days.

(21) Appl. No.: 10/277,782

(22) Filed: Oct. 22, 2002

(65) Prior Publication Data

US 2004/0074643 A1 Apr. 22, 2004

(51) Int. Cl.$^7$ .............................. F21B 43/22
(52) U.S. Cl. ...................... 166/279; 166/305.1
(58) Field of Search .............. 166/229, 305.1

(56) References Cited

U.S. PATENT DOCUMENTS

| | | | |
|---|---|---|---|
| 2,867,641 A | * | 1/1959 | Ramsden ................. 556/7 |
| 3,175,611 A | * | 3/1965 | Hower ................. 166/292 |
| 3,179,170 A | * | 4/1965 | Burtch et al. ............. 507/242 |
| 3,677,343 A | | 7/1972 | Showalter ................ 166/252 |
| 3,707,194 A | | 12/1972 | Svaldi .................. 166/305 |
| 4,620,596 A | * | 11/1986 | Mondshine ............. 166/292 |
| 5,488,083 A | * | 1/1996 | Kinsey et al. ........... 507/211 |
| 2003/0008778 A1 | * | 1/2003 | Donaldson et al. ....... 507/100 |
| 2003/0220203 A1 | * | 11/2003 | Harris et al. ............ 507/200 |

* cited by examiner

*Primary Examiner*—William Neuder
(74) *Attorney, Agent, or Firm*—Robert A. Kent; C. Clark Dougherty, Jr.

(57) ABSTRACT

Methods of uniformly introducing aqueous treating fluids into subterranean producing zones are provided. The methods are basically comprised of the steps of packing perforation tunnels in the producing zone with a particulate solid anhydrous borate material which degrades and dissolves in water over time. A treating fluid is then introduced into the subterranean zone by way of the packed perforation tunnels whereby the treating fluid uniformly flows into the producing zone. The particulate solid anhydrous borate material in the perforation tunnels is allowed to degrade and dissolve in an aqueous fluid in contact therewith so that the aqueous fluid and produced formation fluids freely flow into the well bore.

24 Claims, No Drawings

METHODS OF INTRODUCING TREATING FLUIDS INTO SUBTERRANEAN PRODUCING ZONES

BACKGROUND OF THE INVENTION

1. Field of the Invention

The present invention provides methods of uniformly introducing treating fluids into subterranean producing zones having perforation tunnels formed therein.

2. Description of the Prior Art

After a well bore is drilled and completed in a subterranean producing zone including the formation of perforation tunnels through casing and cement into the zone, it is often necessary to introduce a treating fluid into the zone. For example, the producing zone can be stimulated by introducing an aqueous acid solution into the producing zone to thereby increase its porosity and the production of hydrocarbons therefrom. In order to insure that the producing zone is contacted by the treating fluid uniformly, it has heretofore been the practice to pack the perforation tunnels in the subterranean zone with a particulate solid diverting agent. The presence of the diverting agent in the perforation tunnels causes the treating fluid introduced therein to be uniformly distributed between all of the perforations whereby the subterranean zone is uniformly treated.

A problem in the use of the above described procedure is that the particulate solid diverting agent must subsequently be removed from the perforation tunnels. This has been accomplished by contacting the particulate solid diverting agent with a fluid which dissolves the diverting agent, i.e., water, oil, xylene, etc. While the clean-up procedure required can be successful in removing the diverting agent, it often entails considerable time and expense to carry out.

Thus, there are needs for improved methods of uniformly introducing a treating fluid into a subterranean producing zone by way of perforation tunnels therein without the requirement of removing the particulate solid diverting agent by contacting it with a clean-up solution.

SUMMARY OF THE INVENTION

The present invention provides improved methods of uniformly introducing treating fluids into subterranean producing zones which meet the needs described above and overcome the deficiencies of the prior art. The methods are useful in subterranean producing zones penetrated by well bores having perforation tunnels formed therein. The methods are comprised of the following steps. A particulate solid anhydrous borate material which degrades and dissolves in water over time is packed into the perforation tunnels. Thereafter, a treating fluid is introduced into the subterranean zone by way of the perforation tunnels containing the particulate solid anhydrous borate material whereby the treating fluid uniformly flows into the producing zone. The particulate solid anhydrous borate material in the subterranean zone and in the perforation tunnels is then allowed to degrade and dissolve in an aqueous fluid in contact therewith so that the aqueous fluid and produced formation fluids freely flow through the perforation tunnels into the well bore penetrating the zone.

The objects, features and advantages of the present invention will be readily apparent to those skilled in the art upon a reading of the description of preferred embodiments which follows.

DESCRIPTION OF PREFERRED EMBODIMENTS

The present invention provides improved methods of uniformly introducing treating fluids into subterranean producing zones penetrated by well bores having perforation tunnels formed therein. The methods are basically comprised of the following steps. A particulate solid anhydrous borate material which degrades and dissolves in water over time is packed into the perforation tunnels and into the subterranean producing zone. Thereafter, a treating fluid is introduced into the subterranean zone by way of the perforation tunnels containing the particulate solid anhydrous borate material whereby the treating fluid uniformly flows into the producing zone. The particulate solid anhydrous borate material in the perforation tunnels is then allowed to degrade and dissolve in an aqueous fluid in contact therewith so that the aqueous fluid and produced formation fluids freely flow through the perforation tunnels into the well bore.

The particulate solid anhydrous borate materials which can be utilized in accordance with this invention include, but are not limited to, anhydrous sodium tetraborate (also known as anhydrous borax), anhydrous boric acid and anhydrous boric oxide. These anhydrous borate materials are only slightly soluble in water. However, with time and heat in the subterranean zone, the anhydrous borate materials react with the surrounding aqueous fluid and are hydrated. The resulting hydrated borate materials are highly soluble in water as compared to the anhydrous borate materials and as a result are dissolved in the aqueous fluid. The total time required for the anhydrous borate materials to degrade and dissolve in an aqueous fluid is in the range of from about 8 hours to about 72 hours depending upon the temperature of the subterranean zone in which they are placed.

The particulate solid anhydrous borate material utilized is packed into the perforation tunnels in the subterranean zone by introducing a carrier fluid containing the particulate solid anhydrous borate material into the subterranean zone. The carrier fluid dissipates into the subterranean zone by way of the perforation tunnels and the particulate solid anhydrous borate material is screened out of the carrier fluid by the formation whereby it is packed into the perforation tunnels. A variety of carrier fluids can be utilized for packing the perforation tunnels with the anhydrous borate material utilized including, but not limited to, water, brines, seawater and formation water. Of these, brines and seawater are preferred.

As mentioned, the treating fluid which is uniformly introduced into the subterranean producing zone can be any of a variety of treating fluids, including, but not limited to, oil, oil-water emulsions, oil base foams, water base foams, fresh water, salt water, formation water and various aqueous solutions. Examples of aqueous treating solutions include, but are not limited to, aqueous acid solutions, aqueous scale inhibiting material solutions, aqueous water blocking material solutions, aqueous clay stabilizer solutions, aqueous chelating agent solutions, aqueous surfactant solutions and aqueous paraffin removal solutions.

When the aqueous treating fluid is an aqueous acid solution, the aqueous acid solution can include one or more acids such as hydrochloric acid, hydrofluoric acid, acetic acid, formic acid and other organic acids. In acidizing procedures for increasing the porosity of subterranean producing zones, a mixture of hydrochloric and hydrofluoric acids is commonly utilized.

Another aqueous treating fluid which can be uniformly introduced into the subterranean producing zone in accordance with this invention is a solution of an aqueous scale inhibitor material. The aqueous scale inhibitor material solution can contain one or more scale inhibitor materials including, but not limited to, tetrasodium ethyleneamine acetate, pentamethylene phosphonate, hexamethylenediamine phosphonate and polyacrylate. These scale inhibitor materials attach themselves to the subterranean zone surfaces whereby they inhibit the formation of scale in tubular goods and the like when hydrocarbons and water are produced from the subterranean zone.

Another aqueous treating solution which can be utilized is a solution of an aqueous water blocking material. The water blocking material solution can contain one or more water blocking materials which attach themselves to the formation in water producing areas whereby the production of water is reduced or terminated. Examples of water blocking materials that can be used include, but are not limited to, sodium silicate gels, organic polymers with metal cross-linkers and organic polymers with organic cross-linkers. Of these, cross-linked organic polymers are preferred.

As will now be understood by those skilled in the art, any of a variety of treating fluids can be uniformly introduced into a subterranean producing zone having a perforation tunnel formed therein in accordance with this invention. Because the treating fluid is uniformly distributed into the subterranean producing zone, the treating fluid reaches all parts of the subterranean zone instead of only a portion of the zone. After the treating fluid has been placed in the zone, the particulate solid anhydrous borate material used degrades and dissolves in an aqueous fluid in contact therewith which allows the aqueous fluid and formation fluids to freely flow into the well bore. The aqueous fluid in which the particulate solid anhydrous borate material is dissolved can be various aqueous fluids, including, but not limited to, water from an aqueous treating fluid introduced into the subterranean zone, overflush water introduced into the zone after a treating fluid is introduced therein and formation water produced in the subterranean zone.

As mentioned, the particulate solid anhydrous borate material utilized degrades when in contact with the aqueous fluid and converts to the hydrated form of borate material. The hydrated borate material then dissolves in the aqueous fluid thereby eliminating the need for contacting the subterranean zone with one or more clean-up fluids. Another advantage of the particulate solid anhydrous borate materials of this invention is that the melting points of the materials are high, i.e., 1367° F. for anhydrous sodium tetraborate and 840° F. for anhydrous boric oxide, and as a result, the materials do not soften at high subterranean zone temperatures.

A preferred method of this invention for uniformly introducing an aqueous treating fluid into a subterranean producing zone penetrated by a well bore having perforation tunnels formed therein is comprised of the steps of: (a) packing the perforation tunnels with a particulate solid anhydrous borate material which degrades and dissolves in water over time, (b) introducing a treating fluid into the subterranean zone by way of the perforation tunnels containing the particulate solid anhydrous borate material whereby the treating fluid uniformly flows into the producing zone; and (c) allowing the particulate solid anhydrous borate material in the perforation tunnels to degrade and dissolve in an aqueous fluid in contact therewith so that the aqueous fluid and produced formation fluids freely flow through the perforation tunnels into the well bore.

Another preferred method of this invention for uniformly introducing an aqueous treating fluid into a subterranean producing zone penetrated by a well bore, having perforation tunnels formed therein is comprised of the steps of: (a) introducing a carrier fluid containing a particulate solid anhydrous borate material which degrades and dissolves in water over time into the perforation tunnels whereby the carrier fluid dissipates into the subterranean zone and the particulate solid anhydrous borate material is packed in the perforation tunnels; (b) introducing a treating fluid into the subterranean zone by way of the perforation tunnels containing the particulate solid anhydrous borate material whereby the treating fluid uniformly flows into the producing zone; and (c) allowing the particulate solid anhydrous borate material in the perforation tunnels to degrade and dissolve in an aqueous fluid in contact therewith so that the aqueous fluid and produced formation fluids freely flow through the perforation tunnels into the well bore.

In order to further illustrate the methods of this invention, the following example is given.

EXAMPLE

The example below demonstrates the degradation over time of anhydrous sodium tetraborate and anhydrous boric acid in seawater solutions of scale inhibitors and 15% hydrochloric solutions. The amount of borate material and the volume of solutions used in the degradation experiments were chosen to simulate down hole conditions (i.e., perforation and well bore volumes). The degradation experiments were carried out in a sealed cell equipped with a sight glass, pressurized with nitrogen to 200 psi and a temperature of 250° F. The degradation of the borate materials was measured by recording the change in volume of the borate materials over time.

Table I below shows the percent volume of degradation over time of anhydrous boric oxide in a 10% phosphonate containing a scale inhibitor/seawater solution. During the first minutes of the experiment there was an initial swelling of the boric oxide resulting in a volume increase. Over time, a gradual degradation of the boric oxide took place with complete degradation of the material occurring in approximately 52 hours.

TABLE I

Degradation of Anhydrous Boric Oxide

| Time (hrs.) | % Volume of Solid |
|---|---|
| 0 | 100 |
| 0.05 | 144.44 |
| 0.083 | 166.67 |
| 0.25 | 161.11 |
| 0.42 | 161.11 |
| 0.92 | 155.56 |
| 1.5 | 144.44 |
| 1.67 | 138.89 |
| 2.17 | 133.33 |
| 2.67 | 133.33 |
| 4.08 | 133.33 |
| 4.75 | 127.78 |
| 5.75 | 127.78 |
| 6.83 | 125 |
| 7.33 | 125 |
| 10.83 | 122.22 |
| 13.5 | 111.11 |
| 21 | 88.89 |
| 23 | 88.89 |
| 24 | 88.89 |
| 26.75 | 77.78 |
| 28 | 77.78 |
| 30 | 72.22 |
| 31.25 | 66.67 |
| 34.25 | 55.56 |

TABLE I-continued

Degradation of Anhydrous Boric Oxide

| Time (hrs.) | % Volume of Solid |
|---|---|
| 45.75 | 22.22 |
| 48.25 | 11.11 |
| 51.75 | 0 |

Table II shows the percent volume of degradation over time of anhydrous boric oxide in a 10% methylenephosphonate containing a scale inhibitor/seawater solution. During the first minutes of the experiment there was an initial swelling of the boric oxide resulting in a volume increase. Over time, a gradual degradation of the boric oxide took place with complete degradation of the material occurring in approximately 47 hours.

TABLE II

Degradation of Anhydrous Boric Acid

| Time (hrs.) | % Volume of Solid |
|---|---|
| 0 | 100 |
| 0.083 | 118.18 |
| 0.17 | 122.72 |
| 0.42 | 118.18 |
| 0.92 | 109.09 |
| 1.5 | 104.55 |
| 1.83 | 104.55 |
| 3.17 | 100 |
| 4.33 | 100 |
| 5.5 | 100 |
| 7.5 | 100 |
| 11.5 | 90.91 |
| 22 | 63.64 |
| 24 | 54.55 |
| 27.75 | 45.45 |
| 31.25 | 36.36 |
| 46.75 | 0 |

Table III shows the percent volume of degradation over time of anhydrous boric oxide in a 10% ammonium salt containing a scale inhibitor/seawater solution. During the first minutes of the experiment there was an initial swelling of the boric oxide resulting in a volume increase. Over time, a gradual degradation of the boric oxide took place with complete degradation of the material occurring in approximately 46 hours.

TABLE III

Degradation of Anhydrous Boric Oxide

| Time (hrs.) | % Volume of Solid |
|---|---|
| 0 | 100 |
| 0.083 | 200 |
| 0.167 | 210 |
| 0.33 | 195 |
| 0.4167 | 175 |
| 0.5 | 160 |
| 1 | 130 |
| 3.25 | 110 |
| 4.75 | 100 |
| 5.75 | 100 |
| 11.25 | 90 |
| 22.25 | 60 |
| 26.75 | 50 |
| 27.75 | 45 |
| 28.75 | 40 |
| 31 | 40 |
| 46 | 0 |

Table IV shows the percent volume of degradation over time of anhydrous boric oxide in a 10% copolymer containing a scale inhibitor/seawater solution. During the first minutes of the experiment there was an initial swelling of the boric oxide resulting in a volume increase. Over time, a gradual degradation of the boric oxide took place with complete degradation of the material occurring in approximately 53 hours.

TABLE IV

Degradation of Anhydrous Boric Oxide

| Time (hrs.) | % Volume of Solid |
|---|---|
| 0 | 100 |
| 0.083 | 137.5 |
| 0.25 | 156.25 |
| 0.67 | 143.75 |
| 0.83 | 137.5 |
| 4.08 | 150 |
| 5.33 | 150 |
| 6.33 | 150 |
| 8.33 | 150 |
| 23.33 | 100 |
| 28.33 | 93.75 |
| 30.33 | 75 |
| 32.33 | 62.5 |
| 47.33 | 25 |
| 53.33 | 0 |

Table V shows the percent volume of degradation over time of anhydrous boric oxide in a 10% neutralized phosphonate containing a scale inhibitor/seawater solution. During the first minutes of the experiment there was an initial swelling of the boric oxide resulting in a volume increase. Over time, a gradual degradation of the boric oxide took place with complete degradation of the material occurring in approximately 70 hours.

TABLE V

Degradation of Anhydrous Boric Oxide

| Time (hrs.) | % Volume of Solid |
|---|---|
| 0 | 100 |
| 0.083 | 138.89 |
| 0.133 | 155.56 |
| 0.167 | 166.67 |
| 0.25 | 161.11 |
| 0.75 | 150 |
| 1.08 | 144.44 |
| 2 | 133.33 |
| 2.92 | 127.78 |
| 5.42 | 122.22 |
| 7.58 | 122.22 |
| 22.58 | 100 |
| 25.58 | 94.44 |
| 27.58 | 77.78 |
| 31.58 | 66.67 |
| 46.58 | 33.33 |
| 49.58 | 27.78 |
| 51.58 | 27.78 |
| 52.58 | 22.22 |
| 53.58 | 22.22 |
| 55.58 | 11.11 |
| 69.58 | 0 |

Table VI shows the percent volume of degradation over time of anhydrous boric oxide in a 15% HCl solution. During the first minutes of the experiment there was an initial swelling of the boric oxide resulting in a volume increase. Over time, a gradual degradation of the boric oxide took place with complete degradation of the material occurring in approximately 60 hours.

TABLE VI

Degradation of Anhydrous Boric Acid

| Time (hrs.) | % Volume of Solid |
|---|---|
| 0 | 100 |
| 0.083 | 133.33 |
| 0.167 | 166.67 |
| 0.25 | 177.78 |
| 0.47 | 172.22 |
| 0.67 | 166.67 |
| 2.41 | 166.67 |
| 3.92 | 188.89 |
| 5.5 | 183.33 |
| 6.17 | 177.78 |
| 12.91 | 155.56 |
| 23.17 | 122.22 |
| 25.5 | 111.11 |
| 28.5 | 100 |
| 29.833 | 94.44 |
| 38.25 | 55.56 |
| 50.75 | 22.22 |
| 59.75 | 0 |

Table VII shows the percent volume of degradation over time of anhydrous sodium tetraborate in a 10% phosphonate containing a scale inhibitor/seawater solution. During the first minutes of the experiment there was an initial swelling of the sodium tetraborate resulting in a volume increase. Over time, a gradual degradation of the sodium tetraborate took place with about 70% of the material degraded in approximately 76 hours.

TABLE VII

Degradation of Anhydrous Sodium Tetraborate

| Time (hrs.) | % Volume of Solid |
|---|---|
| 0 | 100 |
| 0.17 | 105.26 |
| 0.25 | 94.74 |
| 0.58 | 94.74 |
| 2.33 | 94.74 |
| 3.33 | 89.47 |
| 5.58 | 78.95 |
| 10.33 | 73.68 |
| 20.83 | 63.16 |
| 23.08 | 63.16 |
| 26.08 | 63.16 |
| 29.08 | 63.16 |
| 44.33 | 52.63 |
| 76.53 | 31.58 |

Table VIII shows the percent volume of degradation over time of anhydrous sodium tetraborate in a 10% methylenephosphonate containing a scale inhibitor/seawater solution. During the first minutes of the experiment there was an initial swelling of the sodium tetraborate resulting in a volume increase. Over time, a gradual degradation of the sodium tetraborate took place with about 70% of the material degraded in approximately 54 hours.

TABLE VIII

Degradation of Anhydrous Sodium Tetraborate

| Time (hrs.) | % Volume of Solid |
|---|---|
| 0 | 100 |
| 0.083 | 105.26 |
| 0.33 | 105.26 |
| 0.83 | 105.26 |
| 1.5 | 100 |
| 2.17 | 100 |
| 3.17 | 84.21 |
| 4.33 | 84.21 |
| 5.5 | 84.21 |
| 7.5 | 84.21 |
| 11.5 | 73.68 |
| 22 | 63.16 |
| 24 | 63.16 |
| 27.75 | 52.63 |
| 31.25 | 52.63 |
| 46.75 | 52.63 |
| 53.75 | 31.58 |

Table IX shows the percent volume of degradation over time of anhydrous sodium tetraborate in a 10% ammonium salt containing a scale inhibitor/seawater solution. During the first minutes of the experiment there was an initial swelling of the sodium tetraborate resulting in a volume increase. Over time, a gradual degradation of the sodium tetraborate took place with about 60% of the material degraded in approximately 23 hours.

TABLE IX

Degradation of Anhydrous Sodium Tetraborate

| Time (hrs.) | % Volume of Solid |
|---|---|
| 0 | 100 |
| 0.083 | 120 |
| 0.33 | 120 |
| 1 | 120 |
| 2 | 120 |
| 3.5 | 60 |
| 4.5 | 60 |
| 5.5 | 60 |
| 7.75 | 50 |
| 22.75 | 40 |

Table X shows the percent volume of degradation over time of anhydrous sodium tetraborate in a 10% copolymer containing a scale inhibitor/seawater solution. During the first minutes of the experiment there was an initial swelling of the sodium tetraborate resulting in a volume increase. Over time, a gradual degradation of the sodium tetraborate took place with about 90% of the material degraded in approximately 70 hours.

TABLE X

Degradation of Anhydrous Sodium Tetraborate

| Time (hrs.) | % Volume of Solid |
|---|---|
| 0 | 100 |
| 0.33 | 105.56 |
| 0.5 | 88.89 |
| 0.75 | 88.89 |
| 1.58 | 88.89 |
| 3.42 | 88.89 |
| 4.08 | 77.78 |
| 6.08 | 72.22 |
| 8.08 | 72.22 |
| 23.08 | 55.56 |
| 28.08 | 50 |
| 32.08 | 44.44 |
| 47.08 | 33.33 |

TABLE X-continued

Degradation of Anhydrous Sodium Tetraborate

| Time (hrs.) | % Volume of Solid |
|---|---|
| 50.08 | 33.33 |
| 52.08 | 27.78 |
| 54.08 | 25 |
| 56.08 | 22.22 |
| 70.58 | 11.11 |

Table XI shows the percent volume of degradation over time of anhydrous sodium tetraborate in a 10% neutralized phosphonate containing a scale inhibitor/seawater solution. During the first minutes of the experiment there was an initial swelling of the sodium tetraborate resulting in a volume increase. Over time, a gradual degradation of the sodium tetraborate took place with about 75% of the material degraded in approximately 98 hours.

TABLE XI

Degradation of Anhydrous Sodium Tetraborate

| Time (hrs.) | % Volume of Solid |
|---|---|
| 0 | 100 |
| 0.25 | 90 |
| 0.5 | 90 |
| 0.83 | 90 |
| 1.33 | 990 |
| 1.67 | 85 |
| 2.67 | 85 |
| 3.17 | 80 |
| 3.67 | 80 |
| 5.17 | 75 |
| 19.83 | 60 |
| 22.83 | 60 |
| 27.83 | 60 |
| 43.83 | 60 |
| 50.83 | 50 |
| 67.83 | 45 |
| 75.83 | 40 |
| 91.83 | 25 |
| 98.33 | 25 |

Table XII shows the percent volume of degradation over time of anhydrous sodium tetraborate in a 15% HCl solution. During the first minutes of he experiment there was an initial swelling of he sodium tetraborate resulting in a volume increase. Over time, a gradual degradation of the sodium tetraborate took place with complete degradation of the material in approximately 80 hours.

TABLE XII

Degradation of Anhydrous Sodium Tetraborate

| Time (hrs.) | % Volume of Solid |
|---|---|
| 0 | 100 |
| 0.13 | 84.62 |
| 0.18 | 76.92 |
| 0.67 | 53.85 |
| 0.75 | 53.85 |
| 0.92 | 53.85 |
| 1.33 | 46.15 |
| 4.83 | 46.15 |
| 6.83 | 46.15 |
| 11.33 | 46.15 |
| 22.33 | 42.31 |
| 30.58 | 40.38 |
| 35.58 | 36.54 |

TABLE XII-continued

Degradation of Anhydrous Sodium Tetraborate

| Time (hrs.) | % Volume of Solid |
|---|---|
| 46.58 | 30.77 |
| 50.58 | 26.92 |
| 53.17 | 26.92 |
| 56.17 | 26.92 |
| 72.67 | 23.08 |
| 75.67 | 23.08 |
| 80.67 | 0 |

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method comprising:
   placing particulate solid anhydrous borate diverting agents into a perforation tunnel in a subterranean producing zone;
   contacting the perforation tunnel or a portion of the subterranean producing zone with a treating fluid;
   allowing the particulate solid anhydrous borate diverting agents to hydrate and degrade; and
   allowing formation fluids to flow through the perforation tunnel to a well bore penetrating the subterranean producing zone.

2. The method of claim 1 wherein the particulate solid anhydrous borate diverting agents comprise at least one of anhydrous sodium tetraborate, anhydrous boric acid, or anhydrous boric oxide.

3. The method of claim 1 wherein particulate solid anhydrous borate diverting agents hydrate and degrade within about 8 to about 72 hours.

4. The method of claim 1 wherein the particulate solid anhydrous borate diverting agents are placed in the perforation tunnel with a carrier fluid.

5. The method of claim 4 wherein the carrier fluid includes water, a brine, seawater, or formation water.

6. The method of claim 1 wherein the treating fluid is a oil-based fluid, an oil-water emulsion, an oil-based foam, a water-based foam, fresh water, salt water, a brine, formation water, an aqueous solution, or a combination thereof.

7. The method of claim 6 wherein the aqueous solution is an aqueous acid solution, an aqueous scale inhibiting material solution, an aqueous water blocking material solution, an aqueous clay stabilizer solution, an aqueous chelating agent solution, an aqueous surfactant solution, an aqueous paraffin removal solution, or a combination thereof.

8. The method of claim 1 wherein the treating fluid comprises at least one of an organic acid, hydrochloric acid, hydrofluoric acid, acetic acid, or formic acid.

9. The method of claim 1 wherein the treating fluid comprises at least one of hydrofluoric acid or hydrochloric acid.

10. The method of claim 7 wherein the aqueous scale inhibiting material solution comprises at least one of tetrasodium ethylenearnine acetate, pentamethylene phosphonate, hexamethylenediamine phosphonate, or polyacrylate.

11. The method of claim 7 wherein the aqueous water blocking material solution comprises at least one blocking material that is capable of attaching to the subterranean formation to reduce the production of water therefrom.

12. The method of claim 7 wherein the aqueous water blocking material solution comprises at least one of a sodium silicate gel, an organic polymer with a metal cross-linker, or an organic polymer with an organic cross-linker.

13. The method of claim 1 wherein the treating fluid is uniformly distributed in a portion of the subterranean producing zone surrounding the perforation tunnel.

14. The method of claim 1 wherein the particulate solid anhydrous borate diverting agents hydrate and degrade in the presence of the treating fluid, an aqueous fluid introduced into the subterranean producing zone after the treating fluid is placed therein, or formation water produced in the subterranean producing zone.

15. A method comprising:
packing a perforation tunnel in a producing zone in a subterranean formation with at least one particulate solid anhydrous borate diverting agent;
introducing a treating fluid into the subterranean formation through the producing zone; and
allowing the particulate solid anhydrous borate material to degrade so as to allow formation fluids to flow through the perforation tunnel.

16. The method of claim 15 wherein the treating fluid acidizes a portion of the subterranean producing zone.

17. The method of claim 15 wherein the treating fluid comprises at least one of an aqueous acid solution, an aqueous scale inhibiting material solution, an aqueous water blocking material solution, an aqueous clay stabilizer solution, an aqueous chelating agent solution, an aqueous surfactant solution, or an aqueous paraffin removal solution.

18. The method of claim 15 wherein the treating fluid comprises at least one of an organic acid, hydrochloric acid, hydrofluoric acid, acetic acid, or formic acid.

19. The method of claim 15 wherein the treating fluid comprises at least one of hydrofluoric acid, or hydrochloric acid.

20. The method of claim 15 wherein the treating fluid comprises at least one of a sodium silicate gel, an organic polymer with a metal cross-linker, or an organic polymer with an organic cross-linker.

21. A method of producing hydrocarbons from a producing zone in a subterranean formation comprising:
placing particulate solid anhydrous borate diverting agents in a perforation tunnel in the producing zone so as to at least partially pack the perforation tunnel;
introducing a treating fluid into the perforation tunnel;
allowing the particulate solid anhydrous borate diverting agents to degrade; and
allowing hydrocarbons to flow through the perforation tunnel into a well bore penetrating the producing zone to be produced therefrom.

22. A method comprising:
introducing a carrier fluid comprising particulate solid anhydrous borate material wherein the particulate solid anhydrous borate material comprises at least one of anhydrous sodium tetraborate, anhydrous boric acid, or anhydrous boric oxide, into a perforation tunnel in a producing zone of a subterranean formation; and
allowing the carrier fluid to dissipate and the particulate solid anhydrous borate diverting agents to be placed into the perforation tunnel.

23. A method of producing hydrocarbons from a producing zone in a subterranean formation comprising:
placing particulate solid anhydrous borate diverting agents in a perforation tunnel in the producing zone so as to at least partially pack the perforation tunnel;
introducing a treating fluid that comprises at least one of hydrochloric acid, hydrofluoric acid, acetic acid, formic acid, an organic acid, tetrasodium ethylenediamine acetate, pentamethylene phosphonate, hexamethylenediamine phosphonate, or polyacrylate into the perforation tunnel;
allowing the particulate solid anhydrous borate diverting agents to degrade; and
allowing hydrocarbons to flow through the perforation tunnel into a well bore penetrating the producing zone to be produced therefrom.

24. A method of producing hydrocarbons from a producing zone in a subterranean formation comprising:
placing particulate solid anhydrous borate diverting agents in a perforation tunnel in the producing zone so as to at least partially pack the perforation tunnel;
introducing a treating fluid that comprises at least one of a sodium silicate gel, an organic polymer with a metal cross-linker, or an organic polymer with an organic cross-linker into the perforation tunnel;
allowing the particulate solid anhydrous borate diverting agents to degrade; and
allowing hydrocarbons to flow through the perforation tunnel into a well bore penetrating the producing zone to be produced therefrom.

* * * * *